Sept. 30, 1930.                H. L. BAKER                1,777,112
                                CORN PICKER
                            Filed Dec. 16, 1929

Inventor:
Hiram L. Baker
By Gilson, Mann & Gittys
Attys.

Patented Sept. 30, 1930

1,777,112

UNITED STATES PATENT OFFICE

HIRAM L. BAKER, OF LELAND, ILLINOIS

CORN PICKER

Application filed December 16, 1929. Serial No. 414,291.

The invention relates to machines for picking the ears from standing corn stalks, and its object is to provide means for maintaining the stalks in approximately upright position until the ears are separated from them, thereby preventing the clogging of the machine and facilitating the picking operation.

Figure 1:
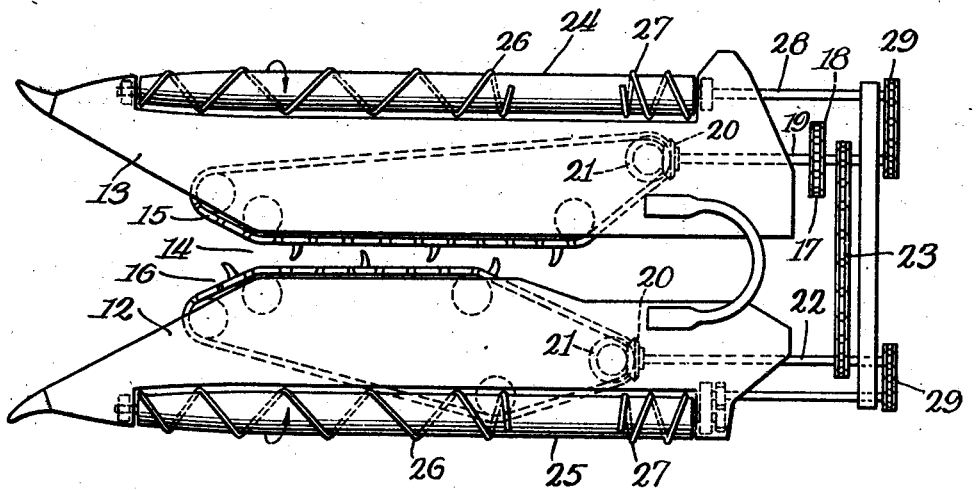
Figure 2:
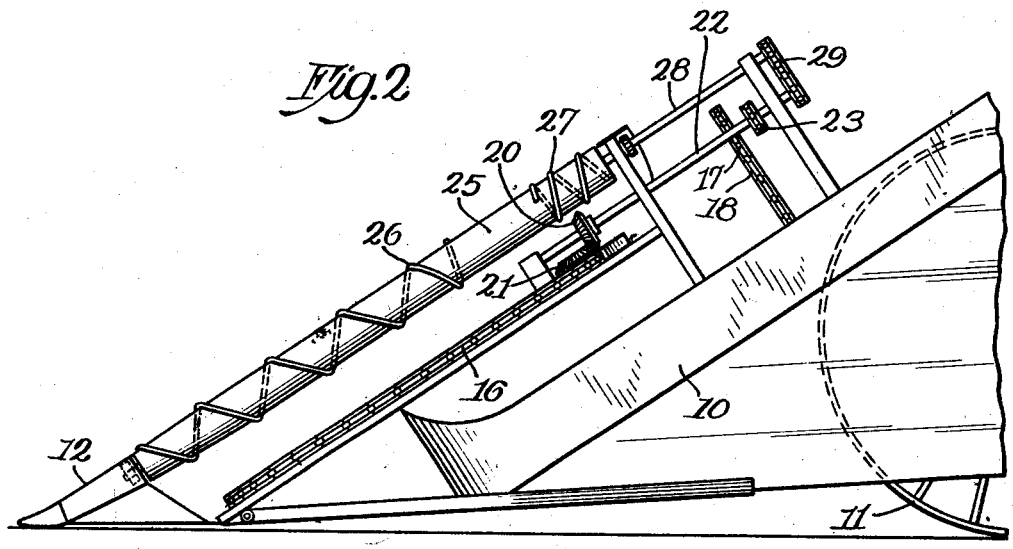

The character of the invention is fully pointed out in the following specification and the invention is illustrated in the accompanying drawings, in which Fig. 1 is a plan view of the picking mechanism of a machine of known type but including the present improvement; and Fig. 2 is a detail, side elevation of the apparatus illustrated in Fig. 1.

The machine to which the present invention is applied comprises a suitable frame indicated at 10 which is carried by wheels one of which is shown at 11; there being mounted upon the frame a pair of guide plates 12, 13 so related as to form a trough-like structure 14, their lower margins, however, being spaced apart as shown. The forward ends of these plates flare outwardly and gather up the standing corn, which may be and frequently is more or less broken down, and guide it to the throat 14 between the plates 12, 13. The rearward ends of these plates are upwardly inclined and the throat 14, while being of sufficient width to permit the stalk to pass through it arrests the ear which is thereby pulled or picked from the stalk as the machine advances. A pair of spurred guide chains 15, 16 are mounted one below each of the plates 12, 13, upon rollers carried by the frame and so arranged that one turn of each chain follows the margin of the throat 14 into which the spurs carried by the chains project. These chains are driven by suitable gearing usually actuated from the wheels as 11, so much of this mechanism as is necessary for the purposes of this description being shown and comprising a sprocket wheel 17 driven by a chain 18 and mounted upon a shaft 19 carrying a bevelled gear 20 meshing with a similar gear 21 mounted on the shaft of one of the rollers or sprockets carrying one of the chains as 15, the shaft 22 on the opposite side of the picker for actuating the other chain as 16 being driven by means of a sprocket chain 23 mounted on the wheels carried by the shafts 19 and 22. As thus far described, the machine is of common construction.

Mounted upon the upper or outer margin of each of the plates 12, 13 is a roller as 24, 25 having a spiral rib 26 extending from its forward end and terminating a short distance from its rearward end, the ribs of the two rollers being reversely wound. The roller 24 at the right side of the machine is turned clockwise and the roller at the left side of the machine is turned in a counterclockwise direction, viewed from the front of the machine, and the ribs are so disposed that they urge any stalks which may engage them backwardly, and guide them along the throat 14. Upon the rearward end of each of these rollers, there is mounted a short guide rib as 27 wound in the reverse direction from the rib 26 and thus arresting the advance movement of the stalks along the throat.

The rollers 24, 25 may be mounted upon plates 12, 13 in any suitable manner. As illustrated, the upper margin of the plate is cut away to form a recess into which the roller fits, the metal at each end of this recess being flanged outwardly and apertured to receive the journals of the rollers. The rearward journal is extended as a shaft 28 parallel with the shaft 19 or 22 and geared thereto as shown at 29.

The rollers 24, 25 may be of any suitable material, preferably of wood, the ribs 26, 27 being formed of metal rods coiled about the roller and firmly secured thereto. Obviously the ribs may be formed as integral portions of the roller or strips of sheet metal embedded therein.

In the operation of the machine, the stalks are gathered by the flaring ends of the plates 12, 13, and guided to the throat 14. There is a tendency of many of the stalks to fall forwardly and this tendency is overcome by the action of the rollers 24, 25 which first come into engagement with the stalks near their butts and they are, therefore, carried along in upright position by the joint action of the gathering chains 15, 16 and the ribs 26.

As the stalks encounter the ribs 27, they are arrested just as the picking operation is accomplished.

It will be understood that the movement of the stalk is relative as to the machine. The stalks are not actually carried along the plates 12, 13, but are held in approximately an upright position by the chains 15, 16 and the rollers 25, 26 as the machine advances upon them, the tendency of the machine to beat them down being thus overcome.

While rollers are shown as formed to be turned in the direction hereinbefore described, the ribs may be oppositely wound about the faces of the roller and the latter turned in the opposite direction from that described.

In its broader aspects, the invention includes any means mounted at or adjacent to the upper or outer margins of the gathering plates for guiding the stalks along the throat.

I claim as my invention:

1. In a corn picker, in combination, a pair of opposed flaring gathering plates, a spirally ribbed guide roller mounted along the outer margin of each plate, and means for turning the rollers.

2. In a corn picker, in combination, a pair of flaring, upwardly inclined gathering plates spaced apart at their adjacent edges to form a throat, and movable means at both margins of each plate for guiding stalks through the throat.

3. In a corn picker, in combination, a pair of opposed flaring gathering plates, a spirally ribbed guide roller mounted along the outer margin of each plate, and means for turning the rollers in the direction to advance the corn stalks along the plates.

4. In a corn picker, in combination, a pair of opposed flaring gathering plates, a spirally ribbed guide roller mounted along the outer margin of each plate, and means for turning the rollers in the direction to advance the corn stalks along the plates, the rib being reversed at the rearward end portion of each roller.

In testimony whereof, I affix my signature.

HIRAM L. BAKER.